Figure 1:
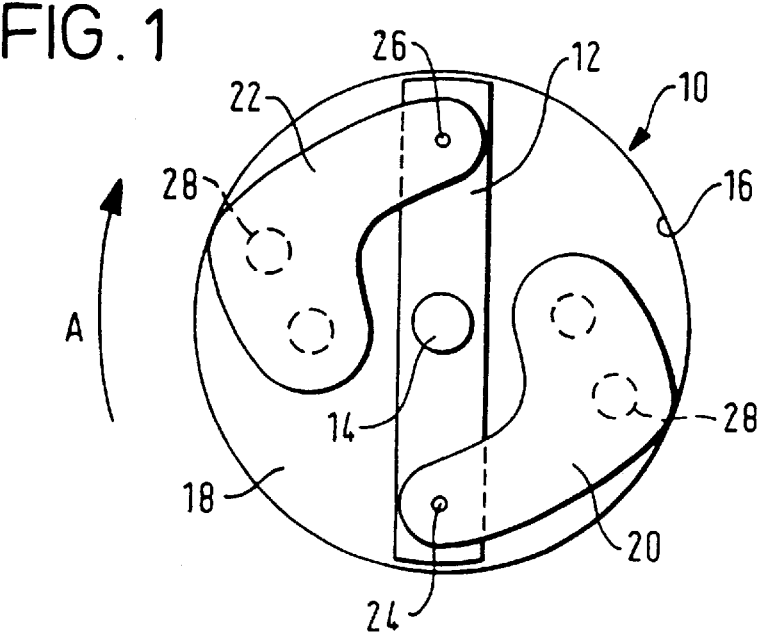

United States Patent [19]
Green

[11] Patent Number: 5,967,443
[45] Date of Patent: Oct. 19, 1999

[54] SPEED GOVERNOR FOR A ROTATIONAL DRIVE

[75] Inventor: Terence R. Green, Milton Keynes, United Kingdom

[73] Assignee: Tensator Limited, Milton Keyes, United Kingdom

[21] Appl. No.: 09/026,532

[22] Filed: Feb. 20, 1998

Related U.S. Application Data

[63] Continuation of application No. PCT/GB96/02039, Aug. 21, 1996.

[30] Foreign Application Priority Data

Aug. 22, 1995 [GB] United Kingdom ................... 9517187

[51] Int. Cl.$^6$ .................................................. B65H 75/30
[52] U.S. Cl. ........................ 242/381.5; 188/185; 188/187
[58] Field of Search ................................. 242/289, 381.5; 254/267; 188/185, 187

[56] References Cited

U.S. PATENT DOCUMENTS

| | | | |
|---|---|---|---|
| 2,323,791 | 7/1943 | Carrington | 188/187 |
| 2,761,650 | 9/1956 | Faugier . | |
| 3,038,109 | 6/1962 | Mowery, Jr. et al. | 188/187 |
| 3,738,456 | 6/1973 | Russell . | |
| 3,844,387 | 10/1974 | Morokoshi | 188/187 |
| 3,889,897 | 6/1975 | Van Zelderen . | |
| 3,927,738 | 12/1975 | Ernst | 188/187 |
| 4,390,140 | 6/1983 | Karlsson et al. | 242/289 |
| 4,487,380 | 12/1984 | King . | |
| 4,582,179 | 4/1986 | Nelson . | |
| 4,907,756 | 3/1990 | Bourrat . | |
| 5,280,828 | 1/1994 | Reynoso et al. | 188/184 |
| 5,553,832 | 9/1996 | Zaguroli, Jr. | 254/267 |

FOREIGN PATENT DOCUMENTS

| | | |
|---|---|---|
| 2 433 090 | 3/1980 | France . |
| 2 167 820 | 6/1986 | United Kingdom . |

*Primary Examiner*—Donald P. Walsh
*Assistant Examiner*—Emmanuel M. Marcelo
*Attorney, Agent, or Firm*—Pillsbury Madison & Sutro, LLP

[57] ABSTRACT

A speed governor for a rotational drive includes a rotor arranged to be driven by the rotational drive and located within a housing having a cylindrical inner side wall and an end wall. Centrifugal brake shoes are pivotally mounted on the rotor and contact the cylindrical side wall and the end wall during rotation of the rotor in a first direction and to move and remain out of contact with the cylindrical inner side wall and end wall during rotation of the rotor in the opposite direction. The brake shoes may be moved and retained out of contact with the end wall by riding up over a portion of the rotor.

7 Claims, 2 Drawing Sheets

SPEED GOVERNOR FOR A ROTATIONAL DRIVE

This application is a continuation of PCT/GB96/02039, filed Aug. 21, 1996.

The present invention relates to a speed governor for a rotational drive.

Rotational drives are widely used in a variety of situations and it is commonly required to introduce some form of brake mechanism into the drive so as to achieve a steady and often readily determinable, speed of rotation, or to limit the speed of rotation below a level that is considered to be safe in the relevant circumstances.

One example of a rotational drive is that provided by a resilient member such as a coil spring which can be tensioned during rotation of a rotor member to which it is drivingly engaged during rotation of that rotor member in one direction, and which can then release the potential energy stored therein so as to rotate the rotor in the opposite direction.

Such a mechanism is commonly used in a situation where the rotor member comprises a spool around which a webbing member is wound. In a retracted position, the webbing member is fully wound around the spool although pay out of the webbing member can readily be achieved by drawing a free end of the webbing member away from the spool so as to achieve the rotation thereof and the tensioning of the spring member associated with the spool. Once withdrawn from the spool, the webbing member can be used for any particular requirement and is quite commonly connected to an anchorage point so as to provide for a boundary or barrier as required.

Since a mechanism of this nature is commonly required to provide a temporary boundary or barrier, the webbing member is frequently released from an anchorage point and retracted back around the spool. The coil spring member allows for ready retraction of the webbing member by causing the spool to rotate so as to wind the webbing member there around. If the webbing member, once released from the anchorage point, is allowed to rewind freely, the speed of rotation of the spool can create potentially hazardous situations in view of the speed with which the webbing member, and in particular the loose end thereof, is drawn back towards the spool. For example, the free end of the webbing moves back in a relatively unstable manner which can prove dangerous and harmful to persons or objects located in the vicinity of the spool.

Spools of this nature commonly employ speed governor means having centrifugal brakes which serve to limit the speed with which the coil spring can drive the spool so as to retract the webbing. The manner in which a centrifugal brake operates is particularly advantageous since, during pay out of the webbing, the centrifugal braking mechanism has no effect and so does not inhibit the ease with which the webbing can be drawn up from the spool.

Speed governors of the aforementioned nature are known from International Patent Application WO93/16298 and UK Patent Application GB2167820. However, the manner in which the centrifugal brakes of these documents operate is disadvantageously restricted and such known mechanisms can not be readily incorporated for use with rotational drives which may experience indeterminable, and variable, driving forces due to differences in the coil spring driving means. Such known braking mechanisms are particularly sensitive to spring variations and the manner in which the centrifugal brakes can be adapted for use with a variety of particular driving and/or spool arrangements is disadvantageously restricted.

The present invention seeks to provide for speed governor apparatus for a rotational drive having advantages over known speed governor apparatus.

In accordance with one aspect of the present invention there is provided a speed governor for a rotational drive comprising a rotor arranged to be driven by said rotational drive and located within a housing having cylindrical inner side wall means and end wall means, said rotator having centrifugal braking means pivotally mounted thereon and arranged to contact said cylindrical side wall means during rotation of said rotor in the first direction and to move and remain out of contact with said cylindrical inner side wall means during rotation of said rotor in a second direction opposite to said first direction, wherein said centrifugal braking means includes at least one engagement surface for contacting said end wall means during rotation of said rotor in said first direction and said governor includes means for moving and retaining said engagement surface out of contact with said end wall means during rotation of said rotor in said second direction.

The invention is particularly advantageous in that it provides for further frictional contact between the centrifugal braking means and the housing so as to achieve a readily variable and controllable braking of the rotational drive in one direction of rotation and wherein the braking mechanism can still be readily disabled during rotation of the rotor in the opposite direction. Provision of the engagement surface for contacting said end wall means during rotation of said rotor in said first direction allows for the provision of a readily adaptable braking, or speed governing, member and related mechanism.

In particular, the present invention is less sensitive to spring variation than braking mechanisms known in the prior art.

Preferably, said engagement surface comprises at least one engagement formation. The engagement formation can then be provided in any particular shape, and with any particular dimensions, having regard to the braking effect required. In particular, said at least one engagement formation comprises at least one pad member which can advantageously be in the form of a shallow solid cylindrical member.

The engagement formation is advantageously arranged to extend substantially perpendicularly to the lateral extent of said centrifugal braking means such that, in one particular embodiment, said engagement formations are arranged to extend downwardly from the underside of a substantially flat centrifugal braking means.

Advantageously, said centrifugal braking means comprises a substantially elongate brake-shoe member having an outer edge for contacting said cylindrical side wall of said housing and an underside with said engagement surface provided thereon for contacting said end wall means of said housing. In particular, said centrifugal braking means has at least one engagement surface provided at one end thereof and means providing the pivotal connection to said rotor at the other end thereof.

According to one particular feature of the present invention, said centrifugal braking means comprises a substantially L-shaped member. Of course, said centrifugal braking means advantageously comprises a pair of brake-shoe means located at respective outer ends of said rotor.

Preferably, the means for moving and retaining said engagement service out of contact with said end wall means comprises a support surface for engaging said centrifugal braking means upon movement away from said cylindrical inner side wall means.

Preferably, either said support surface or a surface of said braking means arranged to contact said support surface has a bevelled formation so as to achieve the movement of said engagement surface of said braking means out of contact with said end wall means.

Advantageously therefore, the movement of said braking means away from said cylindrical side wall means during rotation of said rotor in said direction as a matter of course also leads to movement of said engagement surface of said braking means out of contact with said end wall means.

To allow for a particularly adaptable embodiment of the present invention, said centrifugal braking means can be provided with said bevelled formation. Thus, the relative dimensions of said bevelled formation can readily be varied having regard to the nature of the at least one engagement surface and, in particular, the manner of braking to be exerted by the speed governor.

One particularly compact embodiment of the present invention advantageously employs at least a portion of said rotor as said support surface. Thus, during the rotation of said rotor in said second direction, said centrifugal braking means are caused to ride up onto said rotor so that said at least one engagement surface is then moved out of contact with said end wall means.

Preferably, said rotational drive comprises a resilient member and, in particular, a spring member. Said spring member is advantageously arranged to drive a spool about which a flexible member can be wound and unwound as required such that said speed governor is arranged for movement with said spool.

Preferably, said speed governor is provided as part of a cassette from which a flexible member such as a webbing member can be withdrawn and retracted as required.

In accordance with another aspect of the present invention there is provided a cassette member having a flexible member wound on a spool therein for extension therefrom, and retraction thereto, as required, and wherein said cassette is provided with a speed governor as defined above.

According to a further aspect of the present invention there is provided a cassette for providing a personnel barrier and having any of the features defined above.

Figure 4:
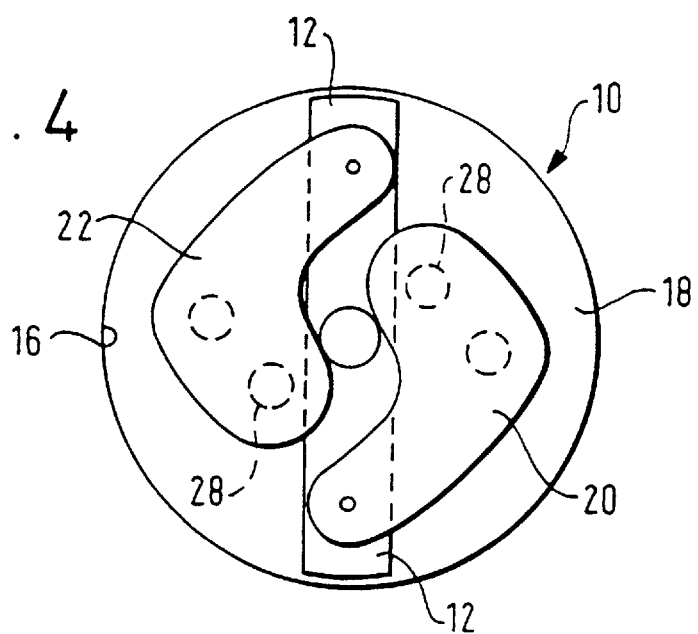
Figure 2:
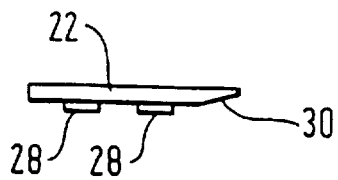
Figure 3:
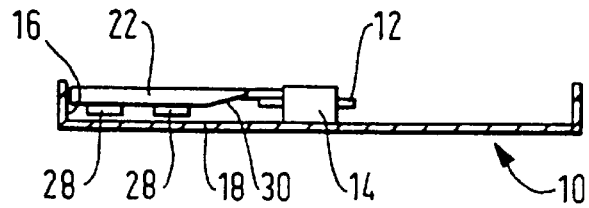
Figure 5:
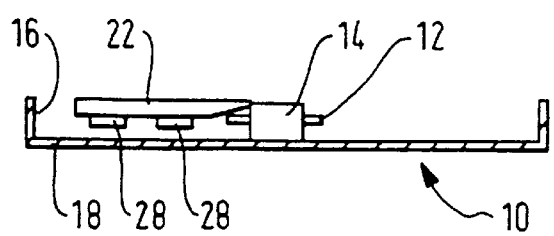
Figure 6:
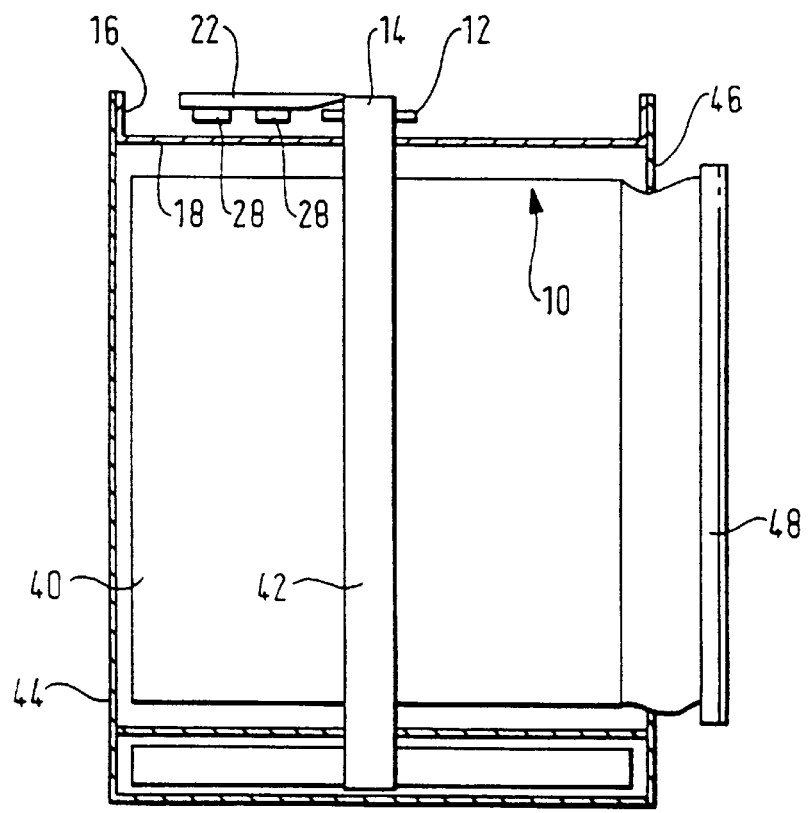

The invention is described further hereinafter, by way of example only, with reference to the accompanying drawings in which:

FIG. 1. is a plan view of a speed governor embodying the present invention;

FIG. 2. is a side elevational view of one of the brake-shoes of the embodiment of FIG. 1.;

FIG. 3. is a schematic cross-sectional view of part of the embodiment of FIG. 1 of a speed governor embodying the present invention and with the brake-shoes in the braking position shown in FIG. 1.;

FIG. 4. is a plan view of the embodiment of the speed governor of FIG. 1. but with the brake-shoes shown in a non-braking position;

FIG. 5. is a schematic cross-sectional view of part of the speed governor embodying the present invention and with the brake-shoes in the position shown in FIG. 4; and FIG. 6. shows in schematic longitudinal cross section a tape barrier cassette incorporating the speed governor of FIG. 5.

Turning to FIG. 1. there is shown a plan view of a speed governor 10 according to an embodiment of the present invention.

The speed governor 10 is arranged for driving engagement with, for example, a spool which has a webbing member wound there around and which is to be housed within a personnel barrier cassette. Such a cassette is commonly mounted upon a stand and can readily serve as a temporary barrier for achieving the controlled movement of people at a given location along a particular path and direction, for example when queuing at a bank, post office or otherwise.

The speed governor 10 comprises a rotor 12 which is mounted for rotation with a shaft 14 upon which the aforementioned spool (not shown) is also mounted for rotation. The rotor 12 is mounted within a cylindrical housing formed in part by a cylindrical inner side wall surface 16 and an annular end wall surface 18 from which the side walls of surface 16 extends.

Mounted at opposite ends of the rotor 12 are a pair of brake shoes 20, 22 which are mounted around respective pivot points 24, 26 so to allow for pivotal motion relative to the rotor 12.

As will be appreciated each of the brake-shoes 20, 22 has a substantially L-shaped configuration where the pivotal attachment 24, 26 is provided at one end thereof and brake pad members 28 are provided at the other end thereof. Each of the brake pad members 28 comprises a solid shallow cylindrical brake pad member which extends downwardly from the underside of each of the brake-shoes 20, 22.

The manner in which the brake pads 28 extend from the brake shoes 20, 22 is shown further in FIG. 2. in which a side view of one of the brake shoes 22 is shown. Also visible in FIG. 2. is a bevelled portion 30 of the underside of the brake-shoe 22.

This bevelled portion 30 is an important feature of the embodiment of the present invention illustrated in the accompanying drawings as will be appreciated from the following.

Turning now to FIG. 3. there is shown a part sectional view of the speed governor of FIG. 1. from which the manner of braking achieved by both brake-shoes 20, 22 even though only one of the brake-shoes 22 is shown, will be readily appreciated.

When considering rotation of the rotor 12 of FIG. 1. in the direction of arrow A in FIG. 1., i.e. clockwise, it will be appreciated that the pivotally mounted brake-shoes 20, 22 serve as a centrifugal braking mechanism such that the centrifugal force experienced by each brake-shoe 20, 22 during rotation of the rotor 12 in the direction of arrow A serves to urge each brake-shoe 20, 22 in the direction of the cylindrical inner side wall surface 16 of the housing.

As will be appreciated from further reference to FIG. 3., the contact between the brake-shoe 22 and the cylindrical inner side wall surface 16 of the housing provides for a braking effect which advantageously governs the speed of rotation of the rotor 12, and thus the spool attached thereto, when rotating in the direction of arrow A. Rotation in this direction corresponds to rotation of the spool member when driven by a coil spring so as to achieve the rewinding of a webbing member around the spool.

It will also be appreciated that, in accordance with the embodiment to the present invention, when rotation of the rotor 12 in the direction of arrow A occurs, the brake pads 28 provided on the underside of the brake shoe 22 also contact the end wall surface 18 of the housing and provide for a further frictional braking contact between the brake-shoe 22 and the housing so as to further assist in the governing of the speed of rotation in the direction of arrow A.

Through the provision of frictional braking engagement between the brake-shoe and both the side wall surface 16 and end wall surface 18 of the housing, the manner and nature of the braking can be readily adapted to any particular scenario. Further, the invention is less sensitive to spring variations in view of the readily adaptable surface area that can be provided for the frictional breaking contact with the housing.

FIG. 4. illustrates the positions adopted by the brake-shoes 20, 22 during rotation of the rotor 12 in the counter-clockwise direction, i.e. in a direction opposite to that of arrow A in FIG. 1. Rotation in this direction is achieved for example when the spool attached to the rotor 12 is being rotated during pay out of the webbing member wound there around. During such rotation so as to achieve pay out of the webbing member, it will be appreciated that, advantageously, no braking or speed governing, action is required of the apparatus of the present invention. This is advantageously achieved since the brake-shoes 20, 22 are caused to pivot inwardly towards the shaft 14 and so are to be moved away from the cylindrical inner side wall surface 16 of the housing as shown in FIG. 4.

With reference to FIG. 5., it can also be seen that, during rotation of the rotor 12 in the counter-clockwise direction of the illustrated embodiment, the brake pads 28 are also caused to move out of contact with the end wall surface 18 of the housing. Thus, no braking effect is provided by the brake-shoes 20, 22 during rotation of the rotor 12 in a pre-determined direction, i.e. counter-clockwise in the drawings, during, for example, pay out of a webbing member wound around a spool which is engagement with the shaft 14 and thus the rotor 12.

The movement of the brake-shoes 20, 22 so as to achieve disengagement between the brake pads 28 and the end wall surface 18 of the housing is, in the illustrated embodiment, advantageously achieved by the co-operation of the aforementioned portion 30 of the undersurface of the brake-shoe 20, 22 and an upper surface portion of the rotor 12.

As will be appreciated with reference to FIG. 5., as the brake-shoes 20, 22 move into the position indicated on FIG. 4. the bevelled portion 30 of each brake-shoe 20, 22 allows for the brake-shoe to ride up on to the upper surface of the rotor 12 which thereby serves to lift the brake-pads 28 out of contact with the end wall surface 18.

Thus, even though the brake-shoes of the present invention have an advantageously and readily adaptable braking effect due to engagement with both the side wall 16 and end wall 18 surfaces of the housing during rotation of the rotor 14 in one particular direction, this enhanced braking effect is simply, and effectively, disabled during rotation of the rotor 12 in the opposite direction.

As mentioned above, the present invention finds particular use as part of a temporary barrier system since readily controllable contraction of a barrier webbing member can advantageously be achieved so as to overcome the danger of damage and/or injury if the webbing member is allowed to be rewound under the sole influence of the coiled spring. During pay out of the webbing member the braking member has no effect and so does not in any way inhibit the required pay out.

In FIG. 6., the speed governor of FIG. 5, is shown incorporated in such a temporary barrier system. The barrier is of the retractable tape type and comprises a webbing tape 40 wound on a spool on an extension 42 of shaft 14. The spool is mounted within a cylindrical housing 44 for which the end wall 18 and side wall 16 of the speed governor form a top. The tape exits from the housing via a slot 46 and the end of the tape is retained outside the slot by a tape end member 48. A sealed unit spring driven tape retraction unit 50 provides a rotational drive for the tape spool.

The cassette illustrated may be mounted on the top of a post or to the side of a support such as a wall. The tape end unit 48 is adapted to connect to the housing of a similar cassette by engagement means (not shown).

It should be appreciated that the present invention is not restricted to the details of the foregoing embodiment. For example, the rotor, housing and brake-shoes can be provided in any particular shape and dimension as indeed can the brake pads 28. Indeed, the brake pads 28 may be formed by providing each brake-shoe with a convex underside surface which, advantageously, not only provides for the required frictional braking contact of the shoe with the end wall surface of the housing, but also provides for an inclined portion in place of the bevelled portion 30 so as to allow for the riding up of the brake-shoes onto the rotor 12. Also, the brake-shoes need not necessarily be arranged to ride up onto the rotor.

I claim:

1. A speed governor for a rotational drive comprising:

a rotor arranged to be driven by said rotational drive and located within a housing having a cylindrical inner side wall and an end wall, said rotor having centrifugal braking means pivotally mounted thereon and arranged to contact said cylindrical side wall during rotation of said rotor in a first direction and to move and remain out of contact with said cylindrical inner wall during rotation of said rotor in a second direction opposite to said first direction, wherein said centrifugal braking means includes at least one engagement surface for contacting said end wall during rotation of said rotor in said first direction, said governor includes means for moving and retaining said engagement surface out of contact with said end wall during rotation of said rotor in said second direction.

2. A speed governor as claimed in claim 1, wherein said engagement surface comprises at least one engagement formation arranged to extend substantially perpendicularly to the lateral extent of said centrifugal braking means.

3. A speed governor as claimed in claim 1 or claim 2, wherein said centrifugal braking means comprises a substantially elongate brake-shoe member having an outer edge for contacting said cylindrical side wall of said housing and an underside with said engagement surface provided thereon for contacting said end wall of said housing.

4. A speed governor as claimed in claim 1, wherein the means for moving and retaining said engagement surface out of contact with said end wall comprises a support surface for engaging said centrifugal braking means upon movement away from said cylindrical inner side wall.

5. A speed governor as claimed in claim 4, wherein at least a portion of said rotor constitutes said support surface.

6. A cassette member comprising:

a flexible member wound on a spool therein for extension therefrom and retraction thereto, as required, and a rotational drive for producing retraction of said flexible member by winding said flexible member onto said spool, wherein said cassette member is provided with a speed governor comprising a rotor arranged to be driven by said rotational drive and located within a housing having a cylindrical inner side wall and an end wall, said rotator having centrifugal braking means pivotally mounted thereon and arranged to contact said cylindrical side wall during rotation of said rotor in a first direction and to move and remain out of contact with said cylindrical inner said wall during rotation of said rotor in a second direction opposite to said first direction, wherein said centrifugal braking means includes at least one engagement surface for contacting said end wall during rotation of said rotor in said first direction, and said governor includes means for moving and retaining said engagement surface out of contact with said end wall during rotation of said rotor in said second direction.

7. A personnel barrier comprising a cassette member as claimed in claim 6.

* * * * *